United States Patent [19]
Wilwerding

[11] Patent Number: 4,872,949
[45] Date of Patent: Oct. 10, 1989

[54] PROCESS FOR TREATMENT OF DRILLING MUD

[76] Inventor: Carl M. Wilwerding, P.O. Box 561, Klamath Falls, Oreg. 97601

[21] Appl. No.: 298,380

[22] Filed: Jan. 18, 1989

Related U.S. Application Data

[63] Continuation of Ser. No. 165,324, Mar. 8, 1988, abandoned.

[51] Int. Cl.⁴ .................. B01D 1/04; E21B 21/06; F26B 11/00
[52] U.S. Cl. .................. 159/47.3; 34/183; 34/185; 34/203; 159/26.1; 159/DIG. 10; 159/DIG. 32; 175/66; 175/206; 202/176; 202/202; 202/235; 203/14; 203/22; 203/74; 203/81; 203/DIG. 8
[58] Field of Search .................. 159/26.1, 46, 47.3, 159/DIG. 10, DIG. 32, DIG. 25, DIG. 16; 203/14, 22, 74, 81, DIG. 8; 34/185, 183, 203; 175/66, 206; 202/176, 202, 205, 235; 210/804; 209/913

[56] References Cited

U.S. PATENT DOCUMENTS

| | | | |
|---|---|---|---|
| 2,748,884 | 6/1956 | Erwin | 175/206 |
| 3,293,768 | 12/1966 | Blank et al. | 34/33 |
| 3,713,499 | 1/1973 | Arscott et al. | 175/206 |
| 4,209,381 | 6/1980 | Kelly, Jr. | 175/66 |
| 4,319,410 | 3/1982 | Heilhecker et al. | 34/183 |
| 4,382,341 | 5/1983 | Bell et al. | 34/1 |
| 4,387,514 | 6/1983 | McCaskill, Jr. | 175/206 |
| 4,411,074 | 10/1983 | Daly | 34/137 |
| 4,546,783 | 10/1985 | Lott | 175/66 |
| 4,554,055 | 11/1985 | Rooney | 159/DIG. 40 |
| 4,649,655 | 3/1987 | Witten | 175/66 |
| 4,654,150 | 3/1987 | Young | 175/206 |
| 4,666,471 | 5/1987 | Cates | 175/66 |
| 4,683,963 | 8/1987 | Skinner | 203/14 |
| 4,725,362 | 2/1988 | Dugat | 175/66 |
| 4,747,961 | 5/1988 | Beer et al. | 175/66 |

Primary Examiner—Virginia Manoharan
Attorney, Agent, or Firm—Townsend and Townsend

[57] ABSTRACT

Used drilling muds containing substantial quantities of organic liquids and water-soluble salts are treated to render them environmentally acceptable for disposal purposes, by drying the muds to evaporate all liquids, aqueous and non-aqueous, preferably in a shell-and-tube type heat exchanger through which they are conveyed and held in suspension by screw conveyors, and preferably with the vapors thus generated flowing in a direction counter-current to the mud. Water-soluble salts are removed from the dried mud components by dissolving with water, and the vapors are condensed and phase separated for further purification and re-use if desired.

9 Claims, 1 Drawing Sheet

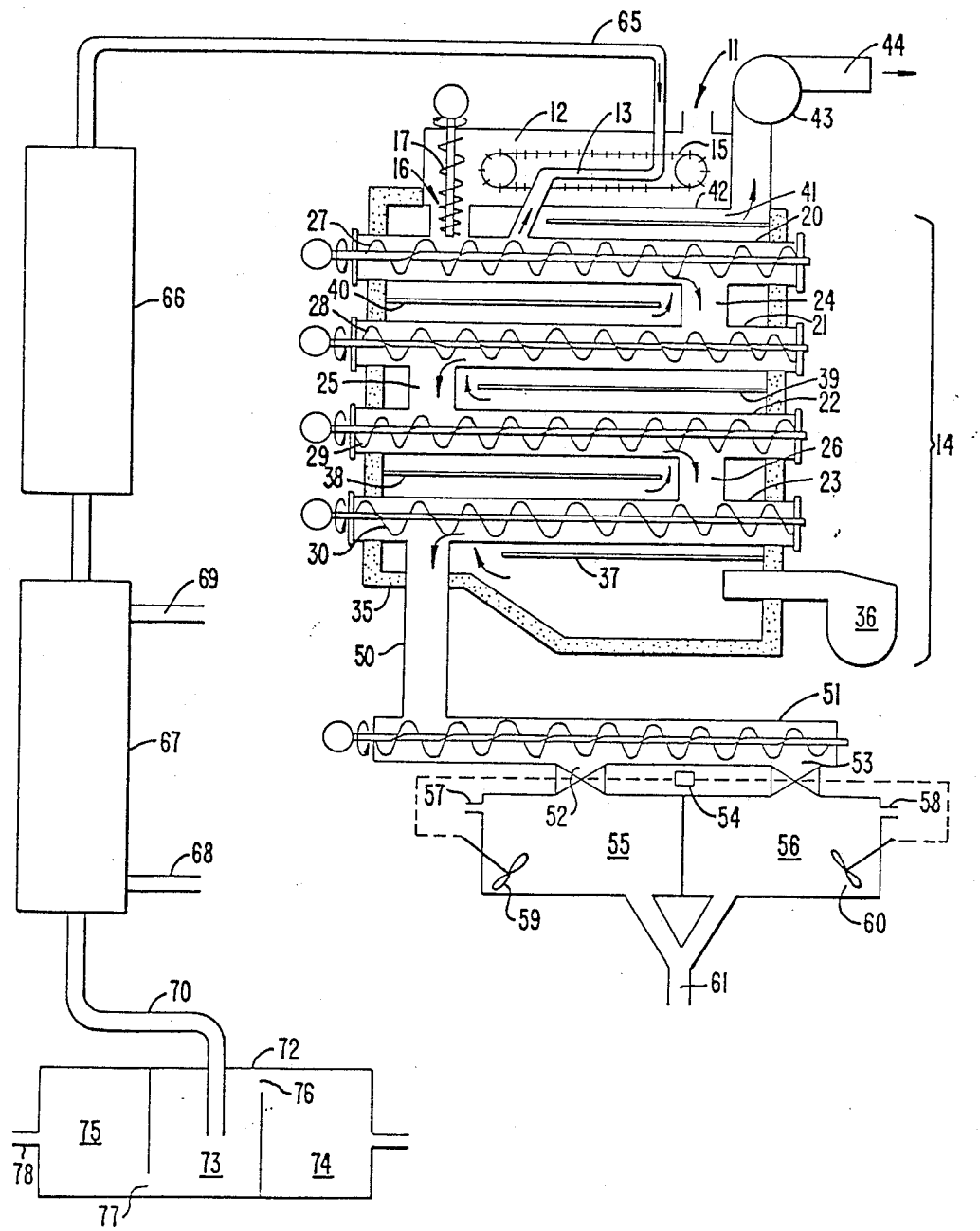
FIG._1.

PROCESS FOR TREATMENT OF DRILLING MUD

This is a continuation of SN 165,324 filed 3-8-88, abandoned.

This invention relates to the use and handling of drilling muds, and to the processing of drilling muds and cuttings contaminated with organic fluids prior to disposal.

BACKGROUND OF THE INVENTION

Drilling fluids or muds (hereinafter collectively referred to as "drilling muds") are an important part of well-drilling operations, performing a variety of functions that influence the drilling rate, and the cost, efficiency, and safety of the operation. In general, the drilling mud is pumped down a hollow drill string, and returns to the surface through the annular space between the hole or casing and the exterior of the drill string. According to conventional methods, the drilling mud after reaching the surface is passed through a series of screens, shale shakers which remove coarse cuttings coated with the mud and fluids, settling tanks or similar equipment to remove formation material called "cuttings" brought to the surface. The mud is then reconstituted and pumped back into the well and the cycle repeated.

Drilling muds are generally composed of liquids containing suspended, finely divided solids of various types. Commonly used liquids are water, diesel crude oil, mineral oil or a mixture of these, and the solids include high-density solids such as hematite ($Fe_2O_3$) and barite ($BaSO_4$), clays such as bentonite, attapulgite, sepiolite, and organophilic clays (prepared for example from bentonite or attapulgite and aliphatic amine salts), and polymers such as guar and xanthan gums, cellulose derivatives, and polyacrylamides, the drilling mud must be disposed of. In the current practice, water-based muds are either buried or discharged at sea. Oil and diesel-based muds, however, cannot be disposed of in this manner and thus present an environmental problem. Used drilling muds recovered from drilling operations in oil-bearing formations are particularly troublesome due to their high content of crude oil from the formations themselves. Since the only dump sites suitable for these muds are Class I dump sites, and they cannot be discharged at sea, these muds are commonly held in tanks or open pits. As an indication of the volume of these materials produced from a typical drilled well, a 10,000 foot well will result in the following:

cuttings: 8030 cu. ft., or approximately 810,810 pounds fluid volume (mud) discharged: 5349 bbl or 224,658 gal solids (dry weight, assuming 15% solids content of mud): 33,700 pounds Clearly there is a growing need for approved disposal facilities and sites.

An additional disposal problem arises from the inclusion of soluble salts in drilling muds. These soluble salts are used for increasing the density of the mud among other reasons, as a means of balancing formation pressures. Examples are potassium chloride, sodium chloride, sodium carbonate, calcium chloride, potassium carbonate, sodium bromide, calcium bromide, zinc chloride and zinc bromide. These salts must be removed prior to land disposal of the spent drilling mud.

SUMMARY OF THE INVENTION

A novel system has now been developed for rendering drilling muds suitable for disposal in an environmentally acceptable manner. This system involves the drying of contaminated mud to effect the separation and removal of organic liquids. Also provided here is a means for the separation and removal of water-soluble salts from the mud, further rendering the mud solids suitable for land disposal.

In its preferred form, the invention provides a continuous process, which keeps the mud in slurry form in a counter-current heat exchanger without settling, until substantially all non-aqueous liquids, and preferably all liquids, aqueous and non-aqueous, have been removed by evaporation. A particularly preferred feature of the invention is the use of a configuration of drying tubes equipped with screw conveyors, arranged in such a way as to cause the vapors coming off of the mud as it dries to flow in a direction counter-current to the mud solids. The vapors are then drawn off and separated from the mud at a point close to the entry point of the mud into the drying tubes.

The invention further provides for dispersing the resulting dried solids in water to dissolve all water-soluble materials, notably the inorganic salts used to increase density. The undissolved solids are then separated from the resulting aqueous solution substantially free of these salts.

In further preferred embodiments of the invention, the vapors formed by evaporation of liquids from the spent drilling mud are used to pre-heat the mud prior to its entry into the drying section.

Further preferred embodiments of the invention, as well as the various advantages and improvements which it offers over the prior art, will be apparent from the following description.

BRIEF DESCRIPTION OF THE DRAWING

The attached figure is a flow diagram of a drilling mud processing unit as one example of a system in accordance with the present invention.

DETAILED DESCRIPTION OF THE INVENTION AND PREFERRED EMBODIMENTS

Following the flow diagram shown in the figure spent drilling mud is fed into an entry port 11. This spent mud contains suspended solids including cuttings and other comminuted materials from the formation, and aqueous and organic liquids generally used in well-drilling operations. The entry port 11 opens into a pre-heat vessel 12, where the temperature of the mud is raised prior to beginning heat exchange in the drying section 14 of the system where evaporation takes place.

This pre-heat vessel 12 is a shell containing vapor tubing 13 through which pass the hot vapors evaporated from the mud in the drying section 14. The incoming mud is conveyed through the pre-heat section by a continuous plate-chain conveyor 15, which serves a dual purpose—(1) to keep the solids in the mud suspended and prevent settling, and (2) to move the mud toward a discharge port 16 at the end opposite the entry port 11.

The heat exchange in this section both preheats the mud and reduces the temperature of the vapors leaving the drying section prior to condensation. The amount of heat exchanged is not critical. In most cases, best results will be achieved when the temperature of the mud is raised to a level between 70° C. and 100° C. A mild pressure, preferably about 1-2 pounds per square inch gauge, is maintained in the pre-heat section to prevent evaporation of any low-boiling components which may be in the mud.

Passage of the mud through the discharge port 16 into the drying section 14 is controlled by a screw conveyor 17 inside the discharge port. The screw conveyor is a variable-speed screw, controlling the flow of mud through the discharge port at a pre-selected rate and turning at a rate sufficient to substantially prevent said drilling mud from settling.

The drying section 14 is a shell-and-tube heat exchanger constructed from a series of four tubes 20, 21, 22, 23 arranged horizontally, one on top of another in a vertical array. The tubes are connected by transfer conduits 24, 25, 26, arranged to cause flow through the tubes in sequence in alternating directions. Screw conveyors 27, 28, 29, 30 are arranged in each of the four drying tubes, respectively, to move the mud slurry in alternating directions. In the arrangement shown, the mud moves from left to right in the first (uppermost) tube 20, from right to left in the second tube 21, from left to right in the third tube 22, and from right to left in the fourth (lowermost) tube 23.

The drying tubes 20, 21, 22, 23 are housed in a heating chamber 35 lined with refractory cement. As shown in the drawing, the drying tubes are arranged in series in a single housing. A burner 36 is placed at the base of the heating chamber, burning a fuel such as diesel, for example. The combustion gases flow upward through the heating chamber around an arrangement of baffles 37, 38, 39, 40, 41, and over the exterior surfaces of the drying tubes 20, 21, 22, 23 where the gases function as a heat exchange fluid. The baffles guide the combustion gases in a direction counter-current to the flow of the mud through the drying tubes. The baffles further permit gradual heating of the tubes 20, 21, 22, 23, thereby preventing warpage and allowing the fluids to be driven off with a minimum of cracking of the diesel oil present in the fluids. This permits the recovery of the diesel oil in an unchanged state, and in effect, steam distills the diesel oil under mild conditions.

The upper wall 42 of the drying chamber is not insulated, and heat exchange is therefore permitted between the combustion gases and the mud in the pre-heat chamber 12. The combustion gases leave the drying section through an exhaust fan 43 and out an exhaust conduit 44, which may be directed to a downstream portion of the system where its residual heat may be further used for a final drying of the mud.

While only four drying tubes are shown, a greater number may be used. They may also be arranged in banks housed inside a single heating chamber, which may contain additional burners to double, triple, or more the through-put volume. In most cases, a retention time of approximately seven minutes will effectively reduce the oil and grease levels of the mud cuttings to 0.31% and 0.15%, respectively.

The drying section 14 evaporates all liquids from the drilling mud to leave a dry residue as the remainder. This dry residue leaves the drying section through a drop-pipe 50. The solids at this point contain all water-soluble materials present in the drilling mud, and are typically at a temperature of approximately 300° C. The drop pipe 50 discharges the dry mud components into a screw conveyor tube 51 which conveys them to a pair of discharge ports 52, 53, controlled by a slide valve 54 which closes and opens the discharge ports in alternating manner. The slide valve 54 is timed to permit only pre-selected amounts of the dried mud components to pass through each of the two discharge ports before closing off that port and opening the other.

The discharge ports 52, 53 discharge the dried mud components into two dissolving tanks 55, 56, respectively each equipped with a water inlet port 57, 58 and an agitator 59, 60. The agitators are controlled by the slide valve 54 such that each is in operation when a corresponding discharge port is closed. In typical operation, agitation is continued for approximately 30 minutes before the resulting slurry is permitted to leave through the discharge port 61. The dissolving tanks 55, 56 thus operate in batchwise manner in an otherwise continuous system.

Once the agitation period in the dissolving tanks is complete, the resulting aqueous solution of water-soluble materials is decanted. The remaining solids may then be vacuum filtered, and conveyed to a heated dryer where they are air dried. As mentioned above, heat for this dryer may be supplied by the combustion gases leaving the exhaust conduit 44.

If the moist mud and cuttings after decanting are found to contain unacceptable amounts of metals, the mud and cuttings are discharged into acid leach tanks where the metals are subjected to the action of a hot dilute acid solution. An example of such an acid solution suitable for this purpose is 4% aqueous acetic acid. After a period of 30-45 minutes, the acid solution is decanted and the mud and cuttings are washed once with a lime water solution to neutralize any remaining acid. The mud and cuttings are then dried as described above.

The acid solution may be neutralized and evaporated to recover all metals present. The water thus removed may be recaptured for reuse.

Returning to the embodiment shown in the drawing, the temperature of the gases in the exhaust conduit may be monitored by a thermostat which controls the burner 36. A target temperature which has been found to be particularly effective for the exhaust gases is 125° C.

For the mud dryer to which the exhaust gases are fed, conventional equipment may again be used. A rotary kiln, where the moist mud enters the upper end and discharges at the lower, while the hot exhaust gases pass through in the opposite direction and out into the atmosphere, has been found to be effective.

Recovery of the dissolved salts from the liquid decanted from the dissolving tanks 55, 56, may be achieved by any conventional means. A particularly convenient method is vacuum distillation under 18 inches of vacuum at 110° C. The dry salts recovered by this process may be placed in storage for possible commercial use, such as, for example, road de-icing and animal salt licks. The water recovered is then cooled and returned for repeated use in the dissolving tanks 55, 56. Fresh water is added to the dissolving tanks as necessary to maintain the required volume, thereby insuring as complete a dissolving of all soluble salts as economically practical.

The vapors produced by evaporation of liquids from the mud in the drying section 14 leave the drying section (and pre-heat section) through a vapor pipe 65. Typically, the temperature of this vapor is approximately 300° C. The vapor is passed through an air-cooled heat exchanger 66, which consists of a fin-andtube configuration using atmospheric air. The degree of temperature drop is dependent upon the atmospheric temperature and the volume of air passing through the heat exchanger.

Further cooling is then achieved in a water-cooled heat exchanger 67, preferably of the shell-and-tube type, equipped with lines for cooling water inlet 68 and outlet 69. The temperature of the vapors in this heat exchanger is lowered to the dewpoint of the lowest boiling component of the vapor mixture.

Condensed liquid leaves the water-cooled heat exchanger through a condensate pipe 70. This liquid contains both aqueous and non-aqueous liquids, which are present in two liquid phases due to the limited miscibility of the aqueous and non-aqueous components. A separation tank 72 permits settling of the two phases in one compartment 73 so that the lighter of the two phases (generally the non-aqueous phase) will flow over a barrier (through a gap 76) into a second compartment 74 and the heavier phase (generally the aqueous phase) will flow underneath a further barrier (through a gap 77) into a third compartment 75. The sizes of these compartments and the widths of the gaps 76, 77 are not critical, and will generally be selected in accordance with the expected volumes of the liquids. In a construction which has been found to be convenient in general, the gap 77 for water passage is 4 inches, and the gap 76 for hydrocarbon passage is 8 inches.

The hot vapors entering the vapor pipe 65 may be put to other uses as alternatives to the heat exchanger shown in the drawing. In off-shore drilling operations, for example, the hot vapors may be used for on-site distillation of the recovered diesel oil from compartment 74. Diesel oil distilled in this manner may be used in drilling, as a mud additive, as diesel fill or as generator fuel. To accomplish this, a two-stage distillation process may be used, with heat supplied by the hot vapors. The first stage is a vacuum distillation under 18 inches of vacuum at 125° C. for removal of all low boiling fractions followed by atmospheric distillation at 250° C. The second stage employs an acid (such as, for example, 85% phosphoric acid) in the liquid phase with activated alumina in the vapor phase for removal of color and odor. Further cooling of the hot vapors if necessary may then be achieved as indicated above.

In general, the water fraction leaving the third compartment 75 at the discharge port 78 will contain small amounts of dissolved and finely divided hydrocarbons. These impurities can be removed by conventional techniques. As one example, the mixture leaving discharge port 78 may be vacuum distilled at 90° C. under 18 inches of vacuum, then passed through a bed of zeolite and a micron filter. The hydrocarbon fraction removed by the vacuum distillation may be fed through the hydrocarbon compartment 74 of the separation tank. The bulk of the hydrocarbon liquid in that compartment, will also contain a small quantity of water in the form of fine droplets. This water may also be removed in accordance with conventional techniques. As one example, a coalescing filter may be employed. To further clarify the hydrocarbon, it may be passed through a molecular sieve.

Oil and gas drilling operations create possibly hazardous atmospheres. As a result, it is typically necessary to exclude all sources of ignition from drilling mud recovery operations. Two combustible gases generally present at drill sites are methane and hydrogen sulfide. While the concentrations of these gases are generally well below the limits of combustibility (in terms of air-to-gas ratio), blowouts sometimes occur and hazardous concentrations sometimes accumulate as a result. In addition, the exhaust gases, though well below autoignition temperatures, can sometimes carry hot particles capable of igniting these gases.

To prevent any possibility of hot gases from exiting the exhaust tube in situations where the latter is vented directly to the atmosphere, an atomizing nozzle may be placed approximately 36 inches from the end of the exhaust tube and water sprayed parallel to the flow of exhaust. As the water vaporizes, it cools any hot particles present, preventing ignition from occurring.

Combustion air necessary for the air burner is another potential source for ignition, as a potential point of flashback when the limits of combustibility are reached. The danger may be eliminated by a series of backups, each designed to support a fail-safe closedown of the burner.

As an example of the latter, an air inlet tube 72 inches long is connected to the burner. Inside the tube is affixed a set of three plates with clapper valves. The plates are set at 18 inches, 36 inches and 60 inches, respectively, from the burner, defining three sections. Vacuum switches are fixed in the first two sections and wired in series. The switches are set at 3 inches water column vacuum, with a 20-second time delay to allow burner startup. Once the required vacuum is reached, an electric valve opens to allow fuel to flow to the burner. In the event of a flashback, the vacuum is lost, and power to the burner, fuel valve and exhaust fan is cut off. The pressure of the flashback causes the clapper valves to close and thus direct the flame into the combustion chamber. A spring-loaded damper is tripped to seal off the combustion air tube at the inlet end.

To add support, two combustible gas sensors, one for methane and the other for hydrogen sulfide are placed at the intake end, outside the tube but within the air stream. These sensors are set at levels 50% below the limits of combustibility and override each other. Upon sensing combustible gases, these sensors override all other safety systems and close down all electrical circuits to the system as a whole. The system remains in this condition as long as combustible gases continue to be detected.

The following example is offered for illustrative purposes only, and is intended neither to define nor limit the invention in any manner.

EXAMPLE

A series of 30 test samples of a commercial drilling muds taken from the drilling of oil wells was run through the treatment system depicted in the Figure and described above. In each case, the mud was essentially stripped of both liquid organic components and water-soluble salts. Analysis of the hydrocarbon fractions in the condensates indicated that the hydrocarbon recovered from the drilling mud was rich in n-undecane, n-dodecane, n-pentadecane and n-eicosane. Also present in lesser amounts were n-tridecane, n-tetradecane, and n-docosane. The salts recovered included sodium chloride and barium chloride as major components, with lesser quantities of calcium chloride and potassium chloride.

The foregoing is offered primarily for purposes of illustration. It will be readily apparent to those skilled in the art that numerous variations and modifications of the various features of equipment, materials and operating conditions beyond those described above may be introduced without departing from the spirit and scope of the invention.

What is claimed is:

1. A process for the removal of organic liquid and water-soluble solids from a drilling mud contaminated therewith, said process comprising:
   (a) feeding said drilling mud into a vertical array of a plurality of horizontal tubes through an entry port in the uppermost tube thereof, said horizontal tubes arranged in series in a shell-and-tube heat exchanger;
   (b) conveying said drilling mud through said horizontal tubes by screw conveyors to cause said drilling mud to flow from the top of said vertical array downward, while passing combustion gases from a burner upward around the exteriors of said horizontal tubes, thereby heating said drilling mud to evaporate substantially all liquid therefrom, leaving a first solid residue;
   (c) removing vapors generated in said horizontal tubes through an exit port adjacent to said entry port thereby effecting counter-current flow of said vapors with respect to said drilling mud;
   (d) combining said first solid residue with water to form a slurry consisting of (i) an aqueous solution of substantially all water-soluble materials contained in said first solid residue, and (ii) a second solid residue comprising said first solid residue substantially devoid of said water-soluble materials; and
   (e) recovering said second solid residue from said slurry.

2. A process in accordance with claim 1 further comprising preheating said drilling mud with vapors generated in step (b) from said organic liquid.

3. A process in accordance with claim 1 in which step (e) comprises decanting said aqueous solution from said slurry and vacuum filtering said second solid residue from the portion of said slurry remaining after said decantation.

4. A process in accordance with claim 1 further comprising recovering said water-soluble materials from said aqueous solution.

5. A process in accordance with claim 1 further comprising recovering said water-soluble materials from said aqueous solution by vacuum distillation.

6. A process in accordance with claim 1 further comprising condensing said liquid evaporated in step (b) to form a condensate containing at least partially immiscible organic and aqueous phases, separating said organic and aqueous phases, and vacuum distilling said aqueous phase prior to disposal to remove therefrom substantially all organic species dissolved therein.

7. A process for the removal of organic liquid and water-soluble solids from a drilling mud contaminated therewith, said process comprising:
   (a) feeding said drilling mud into a plurality of horizontal tubes arranged in series in a vertical array in a shell-and-tube heat exchanger through an entry port, and conveying said drilling mud through said horizontal tubes by screw conveyors turning at a rate sufficient to substantially prevent said drilling mud from settling, said drilling mud flowing from the top of said vertical array downward, while passing combustion gases from a burner upward over said horizontal tubes to evaporate substantially all liquid from said drilling mud to form a vapor stream and a first solid residue, and removing said vapor stream from said horizontal tubes at a location adjacent to said entry port, thereby effecting counter-current flow of said vapor stream with respect to said drilling mud;
   (b) preheating said drilling mud with said vapor stream upstream of said entry port;
   (c) condensing said vapor stream to form a condensate containing at least partially immiscible organic and aqueous phases, separating said organic and aqueous phases, and vacuum distilling said aqueous phase prior to disposal to remove therefrom substantially all organic species dissolved therein;
   (d) combining said first solid residue with water to form a slurry consisting of (i) an aqueous solution of substantially all water-soluble materials contained in said first solid residue, and (ii) a second solid residue comprising said first solid residue substantially devoid of said water-soluble materials; and
   (e) decanting said aqueous solution from said slurry and vacuum filtering said second solid residue from the portion of said slurry remaining after said decantation to recover said second solid residue from said slurry.

8. A process for the removal of organic liquid from a drilling mud contaminated therewith, said process comprising:
   feeding said drilling mud through a vertical array of a plurality of horizontal tubes such that said drilling mud flows from one tube to the next in sequence and in alternating directions, said tubes arranged in series in a single housing comprising a shell-and-tube heat exchanger;
   conveying said drilling mud through said horizontal tubes by screw conveyors to cause said drilling mud to flow from the top of said vertical array downward, while passing combustion gases from a burner upward around the exteriors of said horizontal tubes, thereby heating said drilling mud through the walls of said tubes to evaporate substantially all organic liquid therefrom, said screw conveyors turning at a rate sufficient to substantially prevent said drilling mud from settling; and
   removing vapors generated in said horizontal tubes through an exit port adjacent to said entry port thereby effecting counter-current flow of said vapors with respect to said drilling mud.

9. A process in accordance with claim 8 further comprising preheating said drilling mud with vapors of said organic liquid thereby evaporated.

* * * * *